United States Patent [19]

Staendeke et al.

[11] Patent Number: 4,985,221

[45] Date of Patent: Jan. 15, 1991

[54] PHLEGMATIZED RED PHOSPHORUS

[75] Inventors: Horst Staendeke, Lohmar; Ursus Thëmmler, Erftstadt, both of Fed. Rep. of Germany

[73] Assignee: Hoechst Aktiengesellschaft, Frankfurt am Main, Fed. Rep. of Germany

[21] Appl. No.: 474,475

[22] Filed: Feb. 2, 1990

[30] Foreign Application Priority Data

Feb. 18, 1989 [DE] Fed. Rep. of Germany ....... 3905039

[51] Int. Cl.$^5$ ............................................ C01B 25/023
[52] U.S. Cl. ...................................... 423/265; 423/322
[58] Field of Search ................................ 423/322, 265

[56] References Cited

U.S. PATENT DOCUMENTS

| | | | |
|---|---|---|---|
| 3,974,260 | 8/1976 | Wortmann et al. | 423/322 |
| 4,356,282 | 10/1982 | Largman | 423/322 |
| 4,489,183 | 12/1984 | Twardowska | 423/265 |

FOREIGN PATENT DOCUMENTS

| | | | |
|---|---|---|---|
| 1185591 | 5/1968 | Fed. Rep. of Germany. | |
| 3436161 | 4/1986 | Fed. Rep. of Germany. | |
| 105996 | 9/1976 | Japan | 423/322 |
| 195512 | 11/1984 | Japan | 423/322 |
| 1584865 | 2/1981 | United Kingdom. | |
| 2074995 | 11/1981 | United Kingdom | 423/322 |

*Primary Examiner*—Wayne A. Langel
*Attorney, Agent, or Firm*—Connolly and Hutz

[57] ABSTRACT

Phlegmatized, pulverulent red phosphorus with good free-flowing properties comprises 95 to 99.95% by weight of red phosphorus having a particle size of up to 2 mm, and 0.05 to 5% by weight of polyurethane as phlegmatization agent.

This red phosphorus is prepared by introducing an aqueous polyurethane dispersion into an aqueous suspension of red phosphorus having a particle size of up to 2 mm, after a pH of from 5 to 9 has been set, in a manner such that 5 to 0.05 parts by weight of polyurethane are present per 95 to 99.95 parts by weight of red phosphorus, then stirring the mixture at a temperature of from 20 to 90° C. for 0.5 to 3 hours, and finally drying the phlegmatized red phosphorus at elevated temperature after filtration.

11 Claims, No Drawings

PHLEGMATIZED RED PHOSPHORUS

The invention relates to phlegmatized, pulverulent red phosphorus with good free-flowing properties, and to a process for its preparation.

As is known, red phosphorus is required in pyrotechnology and for the production of friction surfaces for matches and, in addition, is used as a flameproofing agent for plastics, such as, for example, polyamides or polyurethanes. In each of the abovementioned areas of application, the processing of the pulverulent red phosphorus is made more difficult due to its ready flammability. In particular, the formation of dust, which has hitherto been unavoidable in the processing of red phosphorus, forms a considerable hazard since even electrostatic discharge sparks can initiate dust explosions with a high propagation speed. This danger is the greater the finer the grain size of the red phosphorus. However, finely powdered red phosphorus is required, for example, in the flameproofing of plastics. The object was thus to eliminate the abovementioned hazard by phlegmatizing the red phosphorus.

It is known, from German Patent 1,185,591, to protect pulverulent red phosphorus against the action of air and moisture by intimately mixing it with paraffin and/or wax in finely divided form, subsequently heating the mixture to only just above the melting point of the paraffin and/or wax and then cooling the mixture again.

In addition, German Auslegeschrift 2,249,638 (=U.S. Pat. No 3,974,260) describes the phlegmatization of red phosphorus using organic or organosilicon compounds which are liquid at room temperature and atmospheric pressure, are inert, and have a low vapor pressure. The preferred concentration range is 4–10% by weight of phlegmatization agent. This high level of phlegmatization agent significantly limits the utility of the red phosphorus. In addition, the previously known process of applying the phlegmatization agent by intimate mixing of the components is associated with considerable technical disadvantages.

Finally, DE 3,436,161 A1 describes a phlegmatized, pulverulent red phosphorus which is prepared by introducing an aqueous emulsion of the organic compound serving as the phlegmatization agent into an aqueous suspension of red phosphorus, then stirring the mixture at a temperature of from 20° to 90° C. for 0.5 to 3 hours after a pH of 5 to 9 has been set, and finally drying the phlegmatized red phosphorus at elevated temperature after filtration.

On incorporation of a red phosphorus phlegmatized in this way into thermoplastics, however, it has become apparent that, in spite of the finely particulate nature of the red phosphorus employed, it had not been distributed homogeneously in the thermoplastic. Neither was it possible, during extruder processing, to break up the "agglomerates" produced by phlegmatization, and they were still clearly visible as "nests", which is presumably the reason behind the insolubility of the phlegmatization agent in the thermoplastic.

The disadvantages indicated are overcome in the agent according to the invention and the procedure according to the invention in a surprising manner. The invention now relates to phlegmatized, pulverulent red phosphorus with good free-flowing properties which comprises 95 to 99.95% by weight of red phosphorus having a particle size of up to 2 mm, and 0.05 to 5% by weight of polyurethane as phlegmatization agent.

The polyurethane content as phlegmatization agent can preferably be 0.5 to 1.5% by weight. The red phosphorus preferably has a particle size of from 0.0001 mm to 0.5 mm. The phlegmatization agent is, for example, a polyester polyurethane.

However, the invention also relates to an advantageous process for the preparation of phlegmatized, pulverulent red phosphorus with good free-flowing properties which comprises introducing an aqueous polyurethane dispersion into an aqueous suspension of red phosphorus having a particle size of up to 2 mm, after a pH of from 5 to 9 has been set, in a manner such that 5 to 0.05 parts by weight of polyurethane are present per 95 to 99.95 parts by weight of red phosphorus, then stirring the mixture at a temperature of from 20° to 90° C. for 0.5 to 3 hours, and finally drying the phlegmatized red phosphorus at elevated temperature after filtration.

The process of the invention can furthermore preferably and optionally have the features that
(a) the aqueous suspension contains up to 75% by weight of red phosphorus;
(b) the aqueous polyurethane dispersion contains about 40% by weight of the polyurethane serving as phlegmatization agent;
(c) the red phosphorus employed has a particle size of from 0.0001 mm to 0.5 mm;
(d) the mixture is stirred at a temperature of about 60° C. for 1 hour after a pH of 6–8 has been set and after the aqueous polyurethane dispersion has been added;
(e) the phlegmatization agent is a polyester polyurethane;
(f) the mixture is dried at temperatures of from 80° to 120° C. in a stream of nitrogen after filtration.

The aqueous-phase phlegmatization according to the invention surprisingly results in the desired effects being achieved with very low levels of phlegmatization agent.

The examples and tables below serve to further illustrate the invention.

Example 1 (according to the invention)

500 ml of an aqueous alkaline phosphorus suspension containing 250 g of red phosphorus (particle size 0.001 to 0.4 mm) were warmed to 60° C. and adjusted to a pH of 8 by addition of 5% strength sulfuric acid.

Then, 1.9 g of ®Astacin Finish PUD (BASF AG, Ludwigshafen, 40% strength, aqueous, anionic polyester polyurethane dispersion prepared in accordance with DE 2,645,779 C3) were stirred in. The suspension was subsequently stirred at 60° C. for 1 hour and then filtered. The filtration residue was washed in water and subsequently dried at 100° C. in a stream of nitrogen. The polyurethane content was 0.31% by weight.

The results of applicational testing of the red phosphorus phlegmatized in this way are shown in Tables 1 and 2.

Example 2 (according to the invention)

A procedure analogous to Example 1 was followed, but 3.8 g of ®Astacin Finish PUD were employed. The polyurethane content was 0.57% by weight.

The results of applicational testing of the red phosphorus phlegmatized in this way are shown in Tables 1 and 2.

Example 3 (according to the invention)

A procedure analogous to Example 1 was followed, but 6.5 g of ®Astacin Finish PUD were employed. The polyurethane content was 1.04% by weight.

The results of applicational testing of the red phosphorus phlegmatized in this way are shown in Tables 1 and 2.

Example 4 (according to the invention)

A procedure analogous to Example 1 was followed, but 10.0 g of ®Astacin Finish PUD were employed.

The polyurethane content was 1.43% by weight.

The results of applicational testing of the red phosphorus phlegmatized in this way are shown in Tables 1 and 2.

Example 5 (comparison)

A procedure analogous to Example 1 was followed, but no ®Astacin Finish PUD was added.

The results of applicational testing of this non-phlegmatized red phosphorus are shown in Tables 1 and 2.

Example 6 (comparison)

A procedure analogous to Example 1 of DE 3,436,161 A1 was followed. The analytically determined content of phlegmatization agent (di-2-ethylhexyl phthalate) was 0.42% by weight.

The results of applicational testing of the red phosphorus phlegmatized in this way are shown in Tables 1 and 2.

Determination of the free-flowing properties

The free-flowing properties were determined using the PFRENGLE tester indicated in DIN 53 916 (DIN 53 916, published August 1974: Determination of the free-flowing properties of powders and granules).

See also: Tenside 12, 167 (1975).

Determination of dust formation

A relative comparison of dust formation was carried out using a type H-S conimeter from Messrs Sartorius, Göttingen. This instrument has been described by K. Guthmann, Stahl und Eisen 79, 1129 ff. (1959).

To prepare for the measurement, 0.5 g of sample material were weighed into a dry 50 ml weighing glass with ground-glass lid and shaken vigorously for 2 minutes. After the lid had been removed, the phosphorus dust was measured at the intervals given in Table 2.

The values given in Table 1 for the free-flowing properties clearly show that the free-flowing behaviour of the red phosphorus phlegmatized according to the invention is better than that of the red phosphorus phlegmatized in accordance with the prior art and also of unphlegmatized red phosphorus.

At the same time, the formation of dust is very effectively reduced, as shown in Table 2. At comparable contents of phlegmatization agent, the process according to the invention has clear advantages over the prior art.

TABLE 1

Dependency of the free-flowing properties on the content of phlegmatization agent and on the grain size distribution

| Product | Content of phlegmatization agent (%) | Grain size analysis (%)[a] | | | Free-flowing properties (DIN 53 916) | |
|---|---|---|---|---|---|---|
| | | 400–100 μm | 100–45 μm | <45 μm | Height of the powder cone (mm) | Contangent of the powder angle |
| Example 1 (according to the invention) | 0.31 | 1 | 9 | 90 | 4.7[b] | 1.06 |
| Example 2 (according to the invention) | 0.57 | 1 | 10 | 89 | 4.5[b] | 1.11 |
| Example 3 (according to the invention) | 1.04 | 2 | 10 | 88 | 4.3[b] | 1.16 |
| Example 4 (according to the invention) | 1.43 | 4 | 14 | 82 | 4.1[b] | 1.22 |
| Example 5 (Comparison) | — | 1 | 8 | 91 | 5.0[b] | 1.00 |
| Example 6 (Comparison) | 0.42 | 2 | 10 | 88 | 5.5[b] | 0.91 |

[a]The results of grain size analysis were obtained by wet sieving with water/methanol.
[b]Means of 5 individual measurements.

TABLE 2

Dependency of dust formation on the content of phlegmatization agent and on the grain size distribution

| Product | Content of phlegmatization agent (%) | Grain size analysis (%)[a] | | | Dust particles/cm³ of air[b] after a settling time of ... minutes[c] | | | | | | | | |
|---|---|---|---|---|---|---|---|---|---|---|---|---|---|
| | | 400–100 μm | 100–45 μm | <45 μm | 0 | 0.5 | 1.0 | 1.5 | 2.0 | 2.5 | 3.0 | 4.0 | 5.0 |
| Example 1 (according to the invention) | 0.31 | 1 | 9 | 90 | >500 | 280 | 80 | 8 | — | — | — | — | — |
| Example 2 (according to the invention) | 0.57 | 1 | 10 | 89 | >500 | 60 | 5 | — | — | — | — | — | — |
| Example 3 (according to the invention) | 1.04 | 2 | 10 | 88 | 200 | 7 | 1 | — | — | — | — | — | — |
| Example 4 (according to the invention) | 1.43 | 4 | 14 | 82 | 40 | — | — | — | — | — | — | — | — |

TABLE 2-continued

Dependency of dust formation on the content of phlegmatization agent and on the grain size distribution

| Product | Content of phlegmatization agent (%) | Grain size analysis (%)[a] 400–100 μm | 100–45 μm | <45 μm | Dust particles/cm³ of air[b] after a settling time of ... minutes[c] 0 | 0.5 | 1.0 | 1.5 | 2.0 | 2.5 | 3.0 | 4.0 | 5.0 |
|---|---|---|---|---|---|---|---|---|---|---|---|---|---|
| Example 5 (Comparison) | — | 1 | 8 | 91 | >500 | >500 | >500 | >500 | >500 | >500 | >500 | 300 | 80 |
| Example 6 (Comparison) | 0.42 | 2 | 10 | 88 | >500 | >500 | 320 | 140 | 20 | — | — | — | — |

[a] The results of grain size analysis were determined by wet sieving with water/methanol.
[b] The measurement was carried out using a type H-S conimeter from Messrs Sartorius, Gottingen.
[c] The values given are the means of 5 individual measurements

We claim:

1. Phlegmatized, pulverulent red phosphorus with good free-flowing properties, consisting essentially of 95 to 99.95% by weight of red phosphorus having a particle size of up to 2 mm, and 0.05 to 5% by weight of polyurethane as phlegmatization agent.

2. Phlegmatized red phosphorus as claimed in claim 1, wherein the polyurethane content as phlegmatization agent is 0.5 to 1.5% by weight.

3. Phlegmatized red phosphorus as claimed in claim 1, wherein the red phosphorus has a particle size of from 0.0001 mm to 0.5 mm.

4. Phlegmatized red phosphorus as claimed in claim 1, wherein the phlegmatization agent is a polyester polyurethane.

5. A process for the preparation of phlegmatized, pulverulent red phosphorus with good free-flowing properties as claimed in claim 1, which comprises introducing an aqueous polyurethane dispersion into an aqueous suspension of red phosphorus having a particle size of up to 2 mm, after a pH of from 5 to 9 has been set, in a manner such that 5 to 0.05 parts by weight of polyurethane are present per 95 to 99.95 parts by weight of red phosphorus, then stirring the mixture at a temperature of from 20° to 90° C. for 0.5 to 3 hours, and finally drying the phlegmatized red phosphorus at elevated temperature after filtration.

6. A process as claimed in claim 5, wherein the aqueous suspension contains up to 75% by weight of red phosphorus.

7. A process as claimed in claim 5, wherein the aqueous polyurethane dispersion contains about 40% by weight of the polyurethane serving as phlegmatization agent.

8. A process as claimed in claim 5, wherein the red phosphorus employed has a particle size of from 0.0001 mm–0.5 mm.

9. A process as claimed in claim 5, wherein the mixture is stirred at a temperature of about 60° C. for 1 hour after a pH of 6-8 has been set and after the aqueous polyurethane dispersion has been added.

10. A process as claimed in claim 5, wherein the phlegmatization agent is a polyester polyurethane.

11. A process as claimed in claim 5, wherein the mixture is dried at temperatures of 80°–120° C. in a stream of nitrogen after filtration.

* * * * *